(12) United States Patent
Kwon et al.

(10) Patent No.: US 10,115,996 B2
(45) Date of Patent: *Oct. 30, 2018

(54) STEPPED ELECTRODE ASSEMBLY, SECONDARY BATTERY INCLUDING THE ELECTRODE ASSEMBLY, AND METHOD OF MANUFACTURING THE ELECTRODE ASSEMBLY

(71) Applicant: LG Chem, Ltd., Seoul (KR)

(72) Inventors: Sung-Jin Kwon, Daejeon (KR);
Dong-Myung Kim, Daejeon (KR);
Ki-Woong Kim, Daejeon (KR);
Soon-Ho Ahn, Daejeon (KR)

(73) Assignee: LG Chem, Ltd. (KR)

( * ) Notice: Subject to any disclaimer, the term of this patent is extended or adjusted under 35 U.S.C. 154(b) by 797 days.

This patent is subject to a terminal disclaimer.

(21) Appl. No.: 14/360,829

(22) PCT Filed: Feb. 6, 2014

(86) PCT No.: PCT/KR2014/001003
§ 371 (c)(1),
(2) Date: May 27, 2014

(87) PCT Pub. No.: WO2014/123362
PCT Pub. Date: Aug. 14, 2014

(65) Prior Publication Data
US 2016/0372781 A1  Dec. 22, 2016

(30) Foreign Application Priority Data

Feb. 8, 2013 (KR) .................. 10-2013-0014719
Mar. 15, 2013 (KR) .................. 10-2013-0028331

(51) Int. Cl.
*H01M 4/00* (2006.01)
*H01M 10/04* (2006.01)
(Continued)

(52) U.S. Cl.
CPC ......... *H01M 10/0431* (2013.01); *H01M 2/02* (2013.01); *H01M 2/0202* (2013.01);
(Continued)

(58) Field of Classification Search
CPC .. H01M 10/0431; H01M 2/02; H01M 2/0202; H01M 2/037; H01M 2/0277;
(Continued)

(56) References Cited

U.S. PATENT DOCUMENTS 5,714,278 A * 2/1998 Mallinson ............... H01M 2/18
29/623.3
6,387,564 B1 5/2002 Yamashita et al.
(Continued)

FOREIGN PATENT DOCUMENTS

CN 1363121 A 8/2002
JP 2001167743 A 6/2001
(Continued)

OTHER PUBLICATIONS

International Search Report for Application No. PCT/KR2013/002147 dated Jun. 14, 2013.
(Continued)

*Primary Examiner* — Jane J Rhee
(74) *Attorney, Agent, or Firm* — Lerner, David, Littenberg, Krumholz & Mentlik, LLP

(57) ABSTRACT

There is provided a stacked and folded type electrode assembly in which at least two first electrode units having a first area and at least two second electrode units having a second area smaller than the first area are wound and stacked together with a rectangular separator. The electrode assembly includes: a first electrode stack in which the first electrode units are stacked; a second electrode stack in which the second electrode units are stacked; and a stepped portion formed by an area difference between the first electrode (Continued)

1 stack and the second electrode stack, wherein two or more layers of the separator cover the stepped portion, and the separator has the same shape as the stepped portion.

22 Claims, 3 Drawing Sheets

(51) Int. Cl.
| | |
|---|---|
| H01M 10/0587 | (2010.01) |
| H01M 2/02 | (2006.01) |
| H01M 10/0525 | (2010.01) |
| H01M 2/16 | (2006.01) |
| H01M 10/052 | (2010.01) |
| H01M 2/14 | (2006.01) |

(52) U.S. Cl.
CPC ....... *H01M 2/0237* (2013.01); *H01M 2/0277* (2013.01); *H01M 2/145* (2013.01); *H01M 2/1673* (2013.01); *H01M 10/0445* (2013.01); *H01M 10/052* (2013.01); *H01M 10/0525* (2013.01); *H01M 10/0587* (2013.01); *H01M 2/0267* (2013.01); *H01M 2/0275* (2013.01); *H01M 2220/20* (2013.01); *H01M 2220/30* (2013.01); *Y02T 10/7011* (2013.01); *Y10T 29/49108* (2015.01)

(58) Field of Classification Search
CPC ............... H01M 2/145; H01M 2/1673; H01M 10/0445; H01M 10/052; H01M 10/0525; H01M 10/0587; H01M 2/0267; H01M 2/0275; H01M 2220/20; H01M 2220/30; Y10T 29/49108; Y10T 10/7011
See application file for complete search history.

(56) References Cited

U.S. PATENT DOCUMENTS

| | | | |
|---|---|---|---|
| 6,709,785 B2 | 3/2004 | Lee et al. | |
| 7,629,077 B2 | 12/2009 | Bowles et al. | |
| 8,815,450 B1 | 8/2014 | Bates | |
| 2001/0005561 A1 | 6/2001 | Yamada et al. | |
| 2002/0160257 A1 | 10/2002 | Lee et al. | |
| 2002/0160258 A1 | 10/2002 | Lee et al. | |
| 2003/0013012 A1 | 1/2003 | Ahn et al. | |
| 2004/0038125 A1 | 2/2004 | Kim et al. | |
| 2004/0048150 A1 | 3/2004 | Crouch et al. | |
| 2004/0126654 A1 | 7/2004 | Sudan et al. | |
| 2004/0163235 A1* | 8/2004 | Feil .................. | H01M 2/0207 29/623.5 |
| 2005/0079418 A1 | 4/2005 | Kelley et al. | |
| 2007/0099078 A1 | 5/2007 | Zhang et al. | |
| 2008/0032236 A1 | 2/2008 | Wallace et al. | |
| 2008/0274394 A1 | 11/2008 | Schormann et al. | |
| 2008/0280208 A1* | 11/2008 | Naoi .................. | H01M 10/0431 429/247 |
| 2009/0136839 A1 | 5/2009 | Kraznov et al. | |
| 2010/0190081 A1 | 7/2010 | Park et al. | |
| 2012/0015236 A1 | 1/2012 | Spare | |
| 2012/0110836 A1 | 5/2012 | Oh et al. | |
| 2012/0225345 A1 | 9/2012 | Kim | |
| 2013/0004827 A1 | 1/2013 | Miyazaki et al. | |
| 2013/0122350 A1 | 5/2013 | Hagiwara et al. | |
| 2013/0252088 A1 | 9/2013 | Kuriki et al. | |
| 2014/0308570 A1 | 10/2014 | Gaben et al. | |
| 2014/0308571 A1 | 10/2014 | Gaben et al. | |
| 2015/0288021 A1 | 10/2015 | Kwon et al. | |

FOREIGN PATENT DOCUMENTS

| | | | |
|---|---|---|---|
| JP | 2003-132868 A | 5/2003 |
| JP | 2003523061 A | 7/2003 |
| JP | 3680797 B2 | 8/2005 |
| JP | 2015514291 A | 5/2015 |
| KR | 20010104150 A | 11/2001 |
| KR | 20030066960 A | 8/2003 |
| KR | 10-2008-0030700 A | 4/2008 |
| KR | 10-2010-0118173 A | 11/2010 |
| KR | 20110112241 A | 10/2011 |
| KR | 10-2012-0039469 A | 4/2012 |
| KR | 20120116829 A | 10/2012 |

OTHER PUBLICATIONS

Extended Search Report from European Application No. 13853030.8, dated Sep. 11, 2015.
International Search Report for Application No. PCT/KR2014/001003 dated Apr. 30, 2014.
Extended Search Report from corresponding European Application No. 14725905.5, dated Aug. 10, 2015.

* cited by examiner

STEPPED ELECTRODE ASSEMBLY, SECONDARY BATTERY INCLUDING THE ELECTRODE ASSEMBLY, AND METHOD OF MANUFACTURING THE ELECTRODE ASSEMBLY

CROSS-REFERENCE TO RELATED APPLICATIONS

The present application is a national phase entry under 35 U.S.C. § 371 of International Application No.PCT/KR2014/001003 filed Feb. 6, 2014, which claims priority to Korean Patent Applications Nos. 10-2013-0014719, filed Feb. 8, 2013 and 10-2013-0028331 filed Mar. 15, 2013, the disclosures of which are incorporated herein by reference.

TECHNICAL FIELD

The present disclosure relates to a stacked and folded type electrode assembly having a stepped portion, and more particularly, to an electrode assembly including a separator having the same shape as a stepped portion of the electrode assembly, and a method of manufacturing the electrode assembly.

In addition, the present disclosure relates to a secondary battery including the electrode assembly.

BACKGROUND ART

Generally, an electrode assembly having a stepped portion has a structure such as that illustrated in FIG. 1. Referring to FIG. 1, an electrode assembly 1 includes positive electrodes or negative electrodes as outermost electrodes.

In the related art, an electrode assembly having a stepped portion is formed by arranging negative and positive electrodes having a first area on a long separator, folding or stacking the positive and negative electrodes together with the separator to form a first electrode stack not having a stepped portion, forming a second electrode stack having a second area in the same manner, and stacking the first and second electrode stacks.

In the electrode assembly formed as described above by a method of the related art, a slope of the separator is not formed at the stepped portion because the electrode stacks having different areas are individually formed and then stacked.

However, for reasons such as the automation of an assembling process, an electrode assembly having a stepped portion may be formed by arranging electrode units on at least one separator and folding the separator together with the electrode units. In this case, the separator is stretched to have a flat shape and brought into contact with electrodes or electrode surfaces of unit cells, and while the separator is wrapped around an already-formed electrode stack, the next electrodes or unit cells are sequentially disposed on an upper side, a lower side, or upper and lower sides of the electrode stack.

In this case, since a tensile force is applied to the separator, the separator forms a slope at the stepped portion formed between layers of the electrode assembly. However, such a slope of the separator may make it difficult to insert the electrode assembly into a battery case. In addition, during a pressing process, a lower large electrode of the electrode assembly may be bent due to tension of the separator as illustrated in FIG. 6, thereby causing shape defects of the electrode assembly. Therefore, when an electrode assembly is formed by a stacking and folding method, it is necessary to remove tension from a separator.

DISCLOSURE

Technical Problem

An aspect of the present disclosure may provide a stacked and folded type electrode assembly in which tension in a separator between layers is removed.

An aspect of the present disclosure may also provide a secondary battery, a battery pack, and a device including an electrode assembly in which tension in a separator between layers is removed.

An aspect of the present disclosure may also provide a method of removing tension from a separator in an electrode assembly.

Technical Solution

According to an aspect of the present disclosure, a stacked and folded electrode assembly has a stepped portion from which tension is removed. In the stacked and folded type electrode assembly, at least two first electrode units having a first area and at least two second electrode units having a second area smaller than the first area are wound and stacked together with a rectangular separator. The electrode assembly may include: a first electrode stack in which the first electrode units are stacked; a second electrode stack in which the second electrode units are stacked; and a stepped portion formed by an area difference between the first electrode stack and the second electrode stack, wherein two or more layers of the separator cover the stepped portion, and the separator has the same shape as the stepped portion.

The layers of the separator covering the stepped portion may have different thicknesses. For example, the separator covering the stepped portion may have a thickness increasing in an inward direction from an outer surface of the electrode assembly.

At least an outermost layer of the separator covering the stepped portion may be cut, or all the layers of the separator may be cut.

The separator covering the stepped portion may be elongated. A thickness of the separator at a portion covering the stepped portion may be 95% or less of a thickness of the separator at portions disposed between the electrode units.

The second electrode stack may include an electrode stack including at least one electrode unit having an area smaller than the second area and disposed on the second electrode units, and the second electrode stack may have at least one stepped portion.

The electrode units may include a single electrode; a unit cell in which at least one positive electrode and at least one negative electrode are stacked with a separator disposed therebetween; or a combination thereof.

The unit cell may include at least one selected from the group consisting of a jelly-roll type unit cell, a stacked type unit cell, a laminated and stacked type unit cell, and a stacked and folded type unit cell.

An uppermost electrode of the first electrode stack may be a negative electrode.

Electrodes facing each other at an interface between the first electrode stack and the second electrode assembly may be different electrodes.

According to another aspect of the present disclosure, a method is provided to manufacture a stacked and folded type electrode assembly having a stepped portion from which tension is removed. The method may include: assembling an electrode assembly by arranging at least two first electrode units having a first area and at least two second electrode units having a second area smaller than the first area on a rectangular separator, and winding the separator to surround the electrode units, in such a manner that a comparatively large electrode stack formed by comparatively large electrode units and a comparatively small electrode stack formed by comparatively small electrode units are stacked to form a stepped portion therebetween, and at least two slopes of the separator having different angles are formed from ends of the comparatively small electrode units to an end of an uppermost side of the comparatively large electrode stack so as to cover the stepped portion; and removing tension of the separator covering the stepped portion so as to remove the slopes of the separator, wherein after the removing of the tension of the separator, the separator has a varying thickness.

After the removing of the tension of the separator, the separator may have a thickness increasing in an inward direction from an outer surface of the electrode assembly.

The removing of the tension of the separator covering the stepped portion may be performed by elongating the separator.

The separator covering the stepped portion may be elongated at 80° C. to 100° C., or may be elongated by pressing the separator with a jig heated to 80° C. to 100° C. The jig may have the same shape as the stepped portion.

According to another aspect of the present disclosure, a second battery may include the electrode assembly, and the electrode assembly is disposed in a battery case of the secondary battery. The battery case may include a stepped portion having the same shape as the stepped portion of the electrode assembly.

Advantageous Effects

According to the present disclosure, when an electrode assembly having a stepped portion is formed by a stacking and folding method, tension in a separator between layers of the electrode assembly is removed. Therefore, the electrode assembly may be easily inserted in a battery case. In addition, during a pressing process, a lower electrode stack of the electrode assembly may not be bent, and thus shape defects of the electrode assembly may be prevented.

BEST MODE

Figure 1:
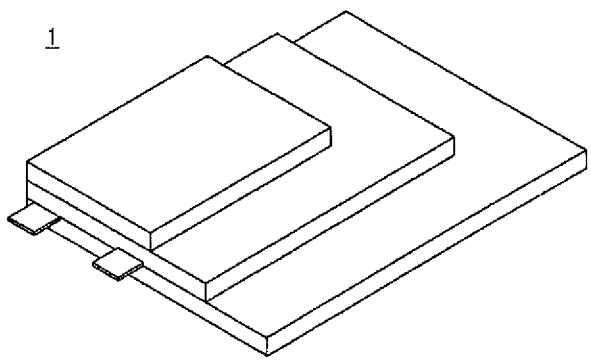
FIG. 1 is a perspective view illustrating an electrode assembly having stepped portions.

Embodiments of the present disclosure will now be described in detail with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity.

According to embodiments of the present disclosure, an electrode assembly may include: a first electrode stack including at least one electrode unit having a first area; and a second electrode stack including at least one electrode unit having a second area smaller than the first area. The first and second electrode stacks may be vertically stacked, and stepped portions may be formed on the electrode assembly as illustrated in FIG. 1.

The electrode unit of each of the electrode stacks may be a unit cell. In the unit cell, unit electrodes such as a negative electrode and a positive electrode, or at least one negative electrode and at least one positive electrode may be stacked with a separator disposed therebetween. The unit cell may be a mono-cell in which a negative electrode and a positive electrode are stacked with a separator disposed therebetween. Alternatively, the unit cell may be a bi-cell including an electrode at a center position and electrodes disposed on both sides of the center electrode. The electrodes disposed on both sides of the center electrodes may have a polarity different from that of the center electrode. The bi-cell may be an A-type bi-cell including a negative electrode as the center electrode, or may be a C-type bi-cell including a positive electrode as the center electrode.

In addition, the unit cell may be one selected from the group consisting of a jelly-roll type unit cell, a stacked type unit cell, a laminated and stacked type unit cell, and a stacked and folded type unit cell, and the outermost two electrodes of the unit cell may have the same polarity or different polarities.

The electrode assembly is formed by disposing the second electrode stack on the first electrode stack. As described above, the first electrode stack includes at least one electrode unit having a first area, and the second electrode stack includes at least one electrode unit having a second area smaller than the first area. Therefore, the electrode assembly has a stepped portion formed by an area difference between electrodes of the first and second electrode stacks.

For example, electrode units having the same area may be stacked in the second electrode stack, and thus the electrode stack may not have a stepped portion. Alternatively, at least one electrode stack having an area smaller than the second area may be disposed on the second electrode stack to form at least one stepped portion. For example, electrode stacks having areas decreasing in a vertical direction may be stacked on the second electrode stack.

In each of the above-described electrode stacks, positive and negative electrodes may be alternately stacked with separators disposed therebetween. Furthermore, in the embodiments of the present disclosure, electrodes facing each other at an interface between electrode stacks may be negative and positive electrodes. In this case, charging and discharging reactions between negative and positive electrodes may occur at an interface between electrode stacks at which a stepped portion is formed, and thus the capacity of a battery may be increased.

Specifically, at an interface on which a stepped portion is formed between the first electrode stack having a comparatively large area and the second electrode stack having a comparatively small area, the outermost electrode of the first electrode stack facing the second electrode stack may be a negative electrode. On the contrary, if a positive electrode is disposed as the outermost electrode of the first electrode stack, lithium may precipitate from a positive electrode active material of the positive electrode during charging and discharging operations of a battery, and thus the stability of the battery may be lowered. Therefore, if negative and positive electrodes face each other at an interface on which a stepped portion is formed, the negative electrode may have a comparatively large area.

In the embodiments of the present disclosure, the electrode assembly may be a stacked and folded type electrode assembly formed by arranging electrode units on a horizontally-long rectangular separator, and folding and winding the electrode units together with the rectangular separator.

Materials that can be used for forming the rectangular separator are not limited. For example, materials generally used for forming separators in the related art may be used to form the rectangular separator of the present disclosure. For example, the rectangular separator may be a multilayer film formed of a material having fine pores such as polyethylene, polypropylene, or a combination thereof. In another example, the rectangular separator may be a polymer film for a solid or gel-type polymer electrolyte, such as a polyvinylidene fluoride, a polyethylene oxide, a polyacrylonitrile, or a polyvinylidenefluoride-co-hexafluoropropylene film.

As described above, the electrode assembly may be formed by a stacking and folding method using a rectangular separator. In this case, at least one first electrode unit forming a first electrode stack and having a first area, and at least one second electrode unit forming a second electrode stack and having a second area may be arranged on the rectangular separator, and the first and second electrode units may be folded and wound in a direction so that the first and second electrode units can be wrapped up in the rectangular separator.

In detail, while electrode units are folded together with the rectangular separator, the rectangular separator surrounds an initially-formed electrode stack while placing an electrode unit on a side of the electrode stack. In this way, while electrode units are disposed on a side or both sides of an initially-formed electrode stack, the electrode units are stacked with the rectangular separator disposed therebetween.

At this time, to form a stepped electrode assembly, the first and second electrode units may be properly arranged on the rectangular separator. That is, the arrangement of the first and second electrode units is not limited to a particular method.

Figure 2:
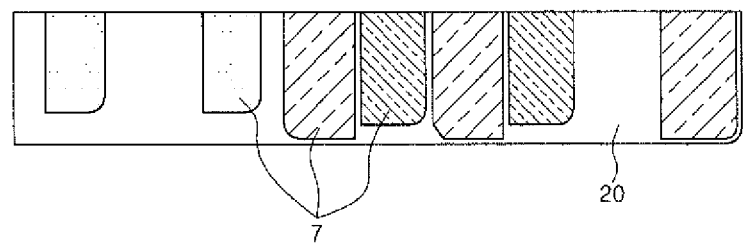
FIGS. 2 and 3 illustrate exemplary arrangements of electrode units on a rectangular separator for forming an electrode assembly having a stepped portion by a stacking and folding method.

For example, as illustrated in FIG. 2, electrode units 7 may be closely arranged on a rectangular separator. In this case, the electrode units 7 may be properly arranged on the rectangular separator according to large, medium, and small sizes thereof and may be folded to form a stepped electrode assembly.

However, a region of the rectangular separator located beside an electrode unit to be first folded may be left empty so as to prevent the electrode unit from disposed on another electrode unit without the rectangular separator disposed therebetween. That is, as illustrated in FIG. 2, after an electrode unit may be disposed on the rectangular separator, a region of the rectangular separator beside the electrode unit may be left empty. Alternatively, a first region of the rectangular separator may be left empty, and an electrode unit may be disposed on the rectangular separator beside the first region (this arrangement is not illustrated in FIG. 2). In addition, electrode units may be arranged on the rectangular separator in such a manner that gaps corresponding to the thickness of an electrode assembly may be formed between the electrode units.

When folding electrode units arranged on a rectangular separator as illustrated in FIG. 2, electrode units may be sequentially disposed on both sides of an initially-formed electrode stack. That is, an electrode unit may be disposed on the topside of an initially-formed electrode stack, and the next electrode unit may be disposed on the opposite side of the initially-formed electrode stack. Therefore, a first-folded electrode unit may be disposed in a center position of a stacked and folded type electrode assembly. It is complex to arrange electrode units as illustrated in FIG. 2. However, after electrode units are arranged as illustrated in FIG. 2, a stepped electrode assembly may be easily formed by folding the arranged electrode units in one direction.

Figure 3:
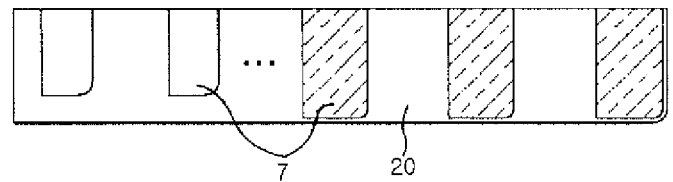

In another example, as illustrated in FIG. 3, electrode units may be arranged on a rectangular separator with empty regions being formed therebetween. In this case, an electrode unit may be disposed on a side of a first-folded electrode unit, and the next empty region of the rectangular separator may be disposed on the other side of the first-folded electrode unit. In this case, even in the case that the amount of the rectangular separator necessary to form an electrode assembly is increased, the electrode units may be simply arranged on the rectangular separator for forming an electrode assembly.

The above-described methods of arranging electrode units may be combined in consideration of merits and demerits thereof, and a stacked and folded type electrode assembly may be formed by the combined method (not illustrated in the drawings). For example, when an electrode assembly having many stepped portions is formed, since the arrangement of electrode units becomes complex, some of the electrode units may be arranged by the latter method to simply form the electrode assembly.

In an embodiment of the present disclosure, when an electrode assembly is formed by a stacking and folding method, a rectangular separator may surround a stepped portion formed between a first electrode stack in which first electrode units are stacked and a second electrode stack in which second electrode units are stacked. Thus, as illustrated in FIG. 4, an rectangular separator 20 may form slopes 10 among the uppermost side of the first electrode stack and the second electrode units of the second electrode stack.

Figure 4:
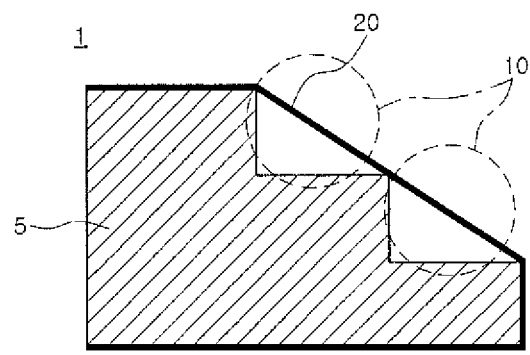
FIGS. 4 and 5 are schematic views illustrating separators receiving tensile force in electrode assemblies formed by a stacking and folding method.
Figure 5:
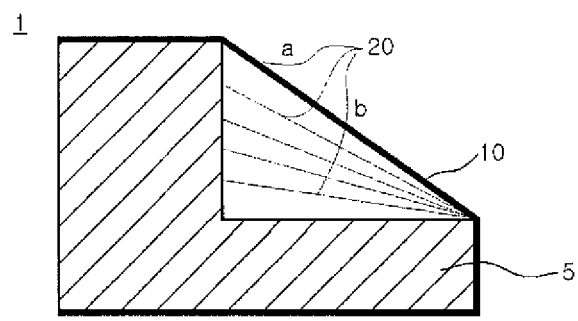

A single slope 10 of the rectangular separator 20 is illustrated between stepped portions in FIG. 4. However, actually, as many slopes 10 of the rectangular separator 20 as the number of electrode units of an upper electrode stack may be formed at different angles as illustrated in FIG. 5.

When an electrode assembly is formed by a stacking and folding method, a separator is folded and wound while applying a tensile force to the separator, so as to maintain electrode units and the separator in a flat shape while the electrode units are folded and wound to face each other. Therefore, a slope of the separator is formed on a stepped portion of the electrode assembly. As a result, the shape of the stepped portion of the electrode assembly formed between electrode units having different sizes may not be present.

Figure 6:
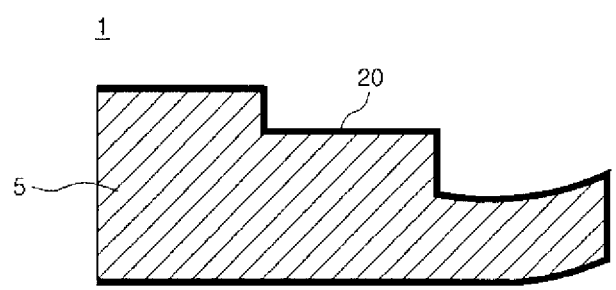
FIG. 6 is a schematic view illustrating an electrode assembly bent due to tension of a separator.

Therefore, when such an electrode assembly is disposed in a battery case, it may be difficult to insert the electrode assembly into the battery case because the shape of the electrode assembly does not correspond to the shape of the batter case due to tension of a separator disposed on a stepped portion of the electrode assembly. Furthermore, when the electrode assembly is disposed in the battery case and is pressed, a lower end portion of the electrode assembly may be bent due to the tension of the separator as illustrated in FIG. 6. Due to this, the electrode assembly may become defective in appearance.

Therefore, such slopes may be removed by lowering the tension of the separator. The tension of the separator may be lowered by an appropriate method according to the material of the separator. For example, the separator may be elongate or cut to remove tension therefrom.

Figure 7:
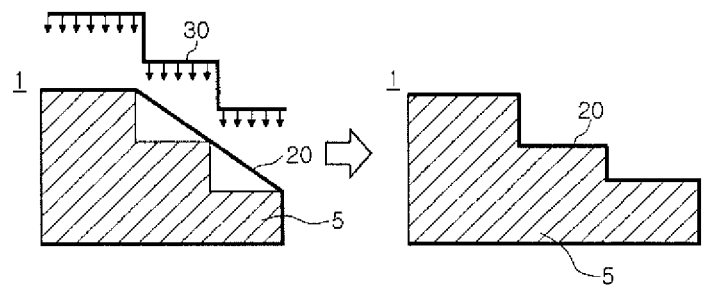
FIG. 7 is a schematic view illustrating a method of removing tension from a separator by pressing the separator with a jig, and an electrode assembly including the separator stepped by the method, according to an embodiment of the present disclosure.
Figure 8:
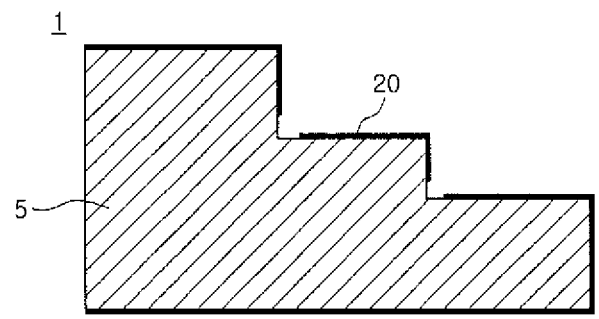
FIG. 8 is a schematic view illustrating an electrode assembly including a separator, the separator being stepped by cutting the separator.

Specifically, as illustrated in FIGS. 7 and 8, the separator 20 may be elongated or cut at a portion located on ends of second electrode units of a second electrode stack and an end of the uppermost side of a first electrode stack so as to remove tension of the separator 20. That is, the separator 20 may be elongated or cut at a portion sloped from an end of the first electrode stack to an end of a second electrode unit located at a lateral end of an stepped electrode assembly 1 so as to remove tension of the separator 20.

In this way, as illustrated in FIGS. 7 and 8, the separator 20 may be shaped or deformed according to the shape of stepped portions formed by stacked electrode units. That is, an electrode assembly may have the same stepped portions as the stepped portions formed by electrode units having different areas.

For example, such a separator may be elongated by heating and pressing the separator. The separator may be heated to a proper temperature according to the material of the separator. For example, the separator may be heated to a temperature within the range of 80° C. to 100° C. For example, as illustrated in FIG. 7, a jig heated to the temperature range may be used to press the separator. A jig having the same stepped portions as the stepped portions of an electrode assembly may be used to remove tension from the separator through a single pressing action.

As described above, the separator may be stepped in the same shape as the shape of stepped portions by removing tension of the separator through a heating and elongation process. As a result, the thickness of the separator at the stepped portions may be 95% or less of the thickness of the separator in other portions thereof, such as a portion placed in an electrode stack. However, the thickness of the separator at the stepped portions is not limited thereto. As described below, the separator may be fractured while being heated and pressed. In this case, the thickness of the separator at a fractured portion may be expressed as 0% as compared with the other portion not elongated.

As described above, the thickness of the separator may be reduced at a heated and elongated portion. The degree of elongation of the separator may be varied according to the slope thereof, and the thickness of the separator may be reduced according to the degree of elongation. In addition, the elongation of the separator may be varied according to the height of the separator.

For example, as illustrated in FIG. 5, when a separator is elongated, the outermost slope (a) and the innermost slope (b) of the separator may be differently elongated, and thus the thicknesses thereof may be different after elongation. That is, the outermost slope (a) of the separator may be most elongated. In some cases, the outermost slope (a) may be fractured. The elongation of the innermost slope (b) may be relatively low.

Therefore, when a stepped portion of a second electrode stack including a plurality of second electrode units is covered with slopes of a separator, the slopes may be formed at different angles from the uppermost side of a first electrode stack to the second electrode units of the second electrode stack, and may be differently elongated to remove tension therefrom. Thus, after the slopes are elongated, the thicknesses of the slopes may be reduced in a direction from the innermost slope to the outermost slope. The thickness of the slopes of the separator may be reduced according to the angles of the slopes, and the degree of thickness reduction is not limited in the present disclosure. For example, in some cases, the outermost slope and some other outer slopes may be fractured, and the possibility of fracture may be highest at the outermost slope.

As described above, the separator may be elongated to remove tension thereof, and while the separator is elongated by heat and pressure, the separator may be unintentionally fractured. Alternatively, the separator may be intentionally cut. That is, slopes of the separator may be cut at stepped portions so as to remove tension from the separator. Since the separator is generally thin, if tension of the separator is removed, the separator may make contact with stepped portions of an electrode assembly as illustrated in FIG. 8. That is, the separator may be shaped according to the shape of the stepped portions of the electrode assembly.

A method of cutting the separator is not limited. That is, various methods may be used to cut the separator. For example, the separator may be cut using a knife, a laser, or a heating wire. Alternatively, cutting lines may be first formed on the separator, and then the separator may be pressed or heated and pressed along the cutting lines to cut the separator along the cutting lines. After tension of the separator is removed by cutting the separator, the separator may make contact with stepped portions of an electrode assembly as illustrated in FIG. 8. That is, the separator may be shaped according to the shape of the stepped portions of the electrode assembly.

Figure 9:
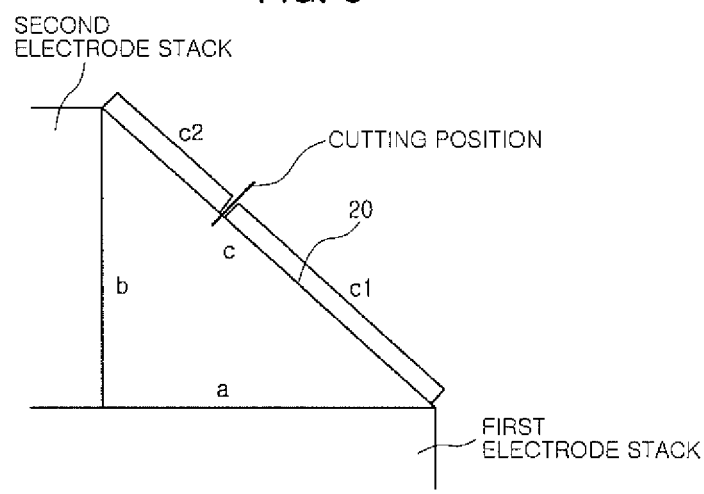
FIG. 9 is a schematic view illustrating how a slope of a separator formed on a stepped portion of an electrode assembly is cut.

The cutting positions of the separator are not limited. Referring to a cross-sectional view of a stepped portion of an electrode assembly illustrated in FIG. 9, a horizontal line (a) is drawn on the outermost side of a first electrode stack not facing a second electrode stack, a vertical line (b) is drawn on a lateral side formed by second electrode units stacked in the second electrode stack. The horizontal line (a) and the vertical line (b) are perpendicular to each other, and a hypotenuse (c) is drawn between the horizontal line (a) and the vertical line (c) to form a right-angled triangle. The hypotenuse (c) refers to a slope of a separator. The slope (c) may be cut at a desired position.

Then, tension of the separator is removed, and a part c1 of the separator is placed on the horizontal line (a), and a part c2 of the separator is placed on the vertical line (b). In this case, if the part c1 or c2 is longer than the line (a) or (b), (c1>a or c2>b), the part c1 or c2 may be folded. Therefore, the separator may be cut so that the part c1 or c2 may not longer than the line (a) or (b). For example, the separator may be cut to satisfy c1=a or c2=b.

As described above, according to the present disclosure, stepped portions of an electrode assembly may not be hidden or blocked by a separator used to stacking electrode units of the electrode assembly. In addition, the electrode assembly may be easily disposed in a battery case without any difficulty caused by tension in a separator. Furthermore, a lower electrode stack of the electrode assembly may not be bent as illustrated in FIG. 6.

Lithium ion secondary batteries or lithium ion polymer secondary batteries may be manufactured using electrode assemblies of the embodiments of the present disclosure. In this case, an electrode assembly may be disposed in a battery case, and the battery case may be a pouch type battery case. Furthermore, in a pouch forming process, the battery case may be previously shaped to have a stepped shape according to the shape of an electrode assembly to be disposed in the battery case.

In addition, a battery pack including at least two battery cells each including an electrode assembly of the present disclosure may be manufactured, and a device may include one or more of such battery cells. Examples of the device may be a cellular phone, a portable computer, a smartphone, a smartpad, a net book, an LEV (light electronic vehicle), an electric vehicle, a hybrid electric vehicle, a plug-in hybrid electric vehicle, and a power storage device.

The invention claimed is:

1. A stacked and folded type electrode assembly in which at least two first electrode units having a first area and at least two second electrode units having a second area smaller than the first area are wound and stacked together with a rectangular separator, the electrode assembly comprising:
    a first electrode stack in which the at least two first electrode units are stacked;
    a second electrode stack in which the at least two second electrode units are stacked; and
    a stepped portion formed by an area difference between the first electrode stack and the second electrode stack,
    wherein two or more layers of the separator cover the stepped portion, and the separator substantially conforms to the shape of the stepped portion such that the portions of the separator covering the stepped portion are elongated to remove tension therefrom.

2. The electrode assembly of claim 1, wherein the portions of the separator covering the stepped portion have different thicknesses as compared to other portions of the separator.

3. The electrode assembly of claim 2, wherein the portions of the separator covering the stepped portion have a thickness increasing in an inward direction.

4. The electrode assembly of claim 1, wherein thicknesses of the portions of the separator covering the stepped portion are 95% or less of a thickness of the separator at other portions.

5. The electrode assembly of claim 1, wherein the second electrode stack further comprises an electrode stack comprising at least one electrode unit having an area smaller than the second area and disposed on the at least two second electrode units, and the second electrode stack has at least two stepped portions.

6. The electrode assembly of claim 1, wherein the at least two first electrode units and the at least two second electrode units each comprise a single electrode; a unit cell in which at least one positive electrode and at least one negative electrode are stacked with a separator disposed therebetween; or a combination thereof.

7. The electrode assembly of claim 6, wherein the unit cell comprises at least one selected from the group consisting of a jelly-roll type unit cell, a stacked type unit cell, a laminated and stacked type unit cell, and a stacked and folded type unit cell.

8. The electrode assembly of claim 1, wherein an uppermost electrode of the first electrode stack is a negative electrode.

9. The electrode assembly of claim 1, wherein electrodes facing each other at an interface between the first electrode stack and the second electrode stack are different electrodes.

10. A method of manufacturing an electrode assembly, the method comprising:
    assembling an electrode assembly by arranging at least two first electrode units having a first area and at least two second electrode units having a second area smaller than the first area on a rectangular separator, and winding the separator to surround the electrode units, in such a manner that a comparatively large electrode stack formed by comparatively large electrode units and a comparatively small electrode stack formed by comparatively small electrode units are stacked to form a stepped portion therebetween, and at least two slopes of the separator having different angles are formed from ends of the comparatively small electrode units to an end of an uppermost side of the comparatively large electrode stack so as to cover the stepped portion; and
    removing tension of the separator covering the stepped portion by elongating the separator so as to remove the slopes of the separator such that the separator substantially conforms to the shape of the stepped portion,
    wherein after the removing of the tension of the separator, the separator has a varying thickness.

11. The method of claim 10, wherein after the removing of the tension of the separator, the separator has a thickness increasing in an inward direction from an outer surface of the electrode assembly.

12. The method of claim 10, wherein the separator covering the stepped portion is elongated at 80° C. to 100° C.

13. The method of claim 10, wherein the separator covering the stepped portion is elongated by pressing the separator with a jig heated to 80° C. to 100° C.

14. The method of claim 13, wherein the jig has the same shape as the stepped portion.

15. A second battery comprising:
    the electrode assembly of claim 1; and
    a battery case in which the electrode assembly is disposed.

16. The secondary battery of claim 15, wherein the battery case comprises a stepped portion having the same shape as the stepped portion of the electrode assembly.

17. A stacked and folded type electrode assembly comprising:
    a first electrode stack in which at least two first electrode units are stacked, the first electrode stack having a first area;
    a second electrode stack in which at least two second electrode units are stacked, the second electrode stack having a second area smaller than the first area; and
    a stepped portion formed by the difference between the first area and the second area,
    wherein the at least two first electrode units and the at least two second electrode units are wound and stacked together with a rectangular separator, and
    wherein two or more layers of the separator cover the stepped portion, and the separator has the same shape as the stepped portion such that the portions of the separator covering the stepped portion are cut to remove tension therefrom.

18. The electrode assembly of claim 1, wherein the separator is elongated at a portion sloped from an end of the first electrode stack to an end of the second electrode unit.

19. The electrode assembly of claim 1, wherein the separator makes contact with vertical and horizontal surfaces of the stepped portion.

20. The electrode assembly of claim 17, wherein the separator makes contact with vertical and horizontal surfaces of the stepped portion.

21. The electrode assembly of claim 1, wherein a thickness of the portions of the separator covering the stepped portion are reduced as compared to other portions of the separator.

22. The electrode assembly of claim 1, wherein the elongated portions of the separator covering the stepped portion are heated and pressed.

* * * * *